(12) United States Patent
Hasting et al.

(10) Patent No.: US 8,499,137 B2
(45) Date of Patent: Jul. 30, 2013

(54) MEMORY MANAGER FOR A NETWORK COMMUNICATIONS PROCESSOR ARCHITECTURE

(75) Inventors: Joseph Hasting, Heidelberg, CT (US); Deepak Mital, Orefield, PA (US)

(73) Assignee: LSI Corporation, Milpitas, CA (US)

( * ) Notice: Subject to any disclaimer, the term of this patent is extended or adjusted under 35 U.S.C. 154(b) by 417 days.

(21) Appl. No.: 12/963,895

(22) Filed: Dec. 9, 2010

(65) Prior Publication Data

US 2011/0225376 A1    Sep. 15, 2011

Related U.S. Application Data

(63) Continuation-in-part of application No. 12/782,379, filed on May 18, 2010, and a continuation-in-part of application No. 12/782,393, filed on May 18, 2010, now Pat. No. 8,255,644, and a continuation-in-part of application No. 12/782,411, filed on May 18, 2010, now Pat. No. 8,407,707.

(60) Provisional application No. 61/313,399, filed on Mar. 12, 2010, provisional application No. 61/313,219, filed on Mar. 12, 2010.

(51) Int. Cl.
    *G06F 12/00*     (2006.01)

(52) U.S. Cl.
    USPC ........... 711/170; 711/171; 711/172; 707/813; 707/814

(58) Field of Classification Search
    USPC ................... 707/813, 814; 711/170, 171, 172
    See application file for complete search history.

(56) References Cited

U.S. PATENT DOCUMENTS

| | | | |
|---|---|---|---|
| 4,622,631 A | 11/1986 | Frank et al. | |
| 5,623,698 A | 4/1997 | Stephenson et al. | |
| 5,689,506 A * | 11/1997 | Chiussi et al. | 370/388 |
| 5,892,766 A | 4/1999 | Wicki et al. | |
| 5,943,283 A | 8/1999 | Wong et al. | |
| 6,038,630 A | 3/2000 | Foster et al. | |
| 6,195,335 B1 | 2/2001 | Calvignac et al. | |
| 6,567,564 B1 | 5/2003 | van der Wal | |
| 6,636,932 B1 | 10/2003 | Regev et al. | |
| 6,728,898 B2 | 4/2004 | Tremblay et al. | |
| 7,089,346 B2 | 8/2006 | Cebulla et al. | |
| 7,161,754 B2 | 1/2007 | Hanazawa et al. | |
| 7,234,018 B1 | 6/2007 | Purcell et al. | |
| 7,251,757 B2 | 7/2007 | Ouellette et al. | |
| 7,293,142 B1 * | 11/2007 | Xu et al. | 711/124 |
| 7,356,622 B2 | 4/2008 | Hattrup et al. | |
| 7,461,208 B1 | 12/2008 | Caprioli et al. | |
| 7,487,321 B2 * | 2/2009 | Muthiah et al. | 711/170 |

(Continued)

*Primary Examiner* — Reginald Bragdon
*Assistant Examiner* — Mehdi Namazi

(57) ABSTRACT

Described embodiments provide a memory manager for a network processor having a plurality of processing modules and a shared memory. The memory manager allocates blocks of the shared memory to requesting ones of the plurality of processing modules. A free block list tracks availability of memory blocks of the shared memory. A reference counter maintains, for each allocated memory block, a reference count indicating a number of access requests to the memory block by ones of the plurality of processing modules. The reference count is located with data at the allocated memory block. For subsequent access requests to a given memory block concurrent with processing of a prior access request to the memory block, a memory access accumulator (i) accumulates an incremental value corresponding to the subsequent access requests, (ii) updates the reference count associated with the memory block, and (iii) updates the memory block with the accumulated result.

20 Claims, 5 Drawing Sheets

U.S. PATENT DOCUMENTS

| | | |
|---|---|---|
| 7,596,142 B1 | 9/2009 | MacAdam |
| 7,660,953 B2 | 2/2010 | Ohran |
| 2002/0029214 A1 | 3/2002 | Yianilos et al. |
| 2002/0165985 A1 | 11/2002 | Chen et al. |
| 2003/0033276 A1 | 2/2003 | Cheng et al. |
| 2003/0115417 A1 | 6/2003 | Corrigan |
| 2003/0123468 A1 | 7/2003 | Nong |
| 2004/0255209 A1 | 12/2004 | Gross |
| 2005/0027920 A1 | 2/2005 | Fitzsimmons et al. |
| 2005/0152352 A1 | 7/2005 | Jun et al. |
| 2006/0256783 A1 | 11/2006 | Ayrapetian et al. |
| 2007/0016756 A1 | 1/2007 | Hsieh et al. |
| 2007/0156725 A1 | 7/2007 | Ehret et al. |
| 2007/0226798 A1 | 9/2007 | Sibert |
| 2008/0162793 A1 | 7/2008 | Chu et al. |
| 2010/0260198 A1 | 10/2010 | Rojas-Cessa et al. |

* cited by examiner

500

MEMORY MANAGER FOR A NETWORK COMMUNICATIONS PROCESSOR ARCHITECTURE

CROSS-REFERENCE TO RELATED APPLICATIONS

This application claims the benefit of the filing date of U.S. provisional application Nos. 61/313,399 filed Mar. 12, 2010 and 61/313,219 filed Mar. 12, 2010, the teachings of which are incorporated herein in their entireties by reference.

This application is a continuation-in-part, and claims the benefit of the filing date, of U.S. patent application Ser. No. 12/782,379 filed May 18, 2010, Ser. No. 12/782,393 filed May 18, 2010 now U.S. Pat. No. 8,255,644, and Ser. No. 12/782,411 filed May 18, 2010 now U.S. Pat. No. 8,407,707, the teachings of which are incorporated herein in their entireties by reference.

The subject matter of this application is related to U.S. patent application Ser. No. 12/430,438 filed Apr. 27, 2009, Ser. No. 12/729,226 filed Mar. 22, 2010, Ser. No. 12/729,231 filed Mar. 22, 2010, the teachings of which are incorporated herein in their entireties by reference.

BACKGROUND OF THE INVENTION

1. Field of the Invention

The present invention relates to communication systems, in particular, to an accelerated processor architecture for network communications.

2. Description of the Related Art

Network processors are generally used for analyzing and processing packet data for routing and switching packets in a variety of applications, such as network surveillance, video transmission, protocol conversion, voice processing, and internet traffic routing. Early types of network processors were based on software-based approaches with general-purpose processors, either singly or in a multi-core implementation, but such software-based approaches are slow. Further, increasing the number of general-purpose processors had diminishing performance improvements, or might actually slow down overall network processor throughput. Newer designs add hardware accelerators to offload certain tasks from the general-purpose processors, such as encryption/decryption, packet data inspections, and the like. These newer network processor designs are traditionally implemented with either i) a non-pipelined architecture or ii) a fixed pipeline architecture.

In a typical non-pipelined architecture, general-purpose processors are responsible for each action taken by acceleration functions. A non-pipelined architecture provides great flexibility in that the general-purpose processors can make decisions on a dynamic, packet-by-packet basis, thus providing data packets only to the accelerators or other processors that are required to process each packet. However, significant software overhead is involved in those cases where multiple accelerator actions might occur in sequence.

In a typical fixed-pipeline architecture, packet data flows through the general-purpose processors and/or accelerators in a fixed sequence regardless of whether a particular processor or accelerator is required to process a given packet. This fixed sequence might add significant overhead to packet processing and has limited flexibility to handle new protocols, limiting the advantage provided by the using accelerators.

In a typical system on chip (SoC), multiple processing modules might concurrently request access to a given address in a shared memory. Some solutions queue memory access requests in a data cache. However, employing a data cache to buffer conflicting memory accesses might require an undesirably physically large cache memory. Further, a typical data cache implementation requires that all queued memory access requests be performed sequentially, thus the shared memory might become a bottleneck to performance of the SoC.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a memory manager for a network processor having a plurality of processing modules and a shared memory. The memory manager allocates blocks of the shared memory to requesting ones of the plurality of processing modules. A free block list tracks availability of memory blocks of the shared memory. A reference counter maintains, for each allocated memory block, a reference count indicating a number of access requests to the memory block by ones of the plurality of processing modules. The reference count is located with data at the allocated memory block. For subsequent access requests to a given memory block concurrent with processing of a prior access request to the memory block, a memory access accumulator (i) accumulates an incremental value corresponding to the subsequent access requests, (ii) updates the reference count associated with the memory block, and (iii) updates the memory block with the accumulated result.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

In accordance with embodiments of the present invention, a memory manager for a network processor having a plurality of processing modules and a shared memory allocates blocks of the shared memory to requesting ones of the plurality of processing modules. A free block list tracks availability of memory blocks of the shared memory. A reference counter maintains, for each allocated memory block, a reference count indicating a number of access requests to the memory block by ones of the plurality of processing modules. The reference count is located with data at the allocated memory block. For subsequent access requests to a given memory block concurrent with processing of a prior access request to the memory block, a memory access accumulator (i) accumulates an incremental value corresponding to the subsequent access requests, (ii) updates the reference count associated with the memory block, and (iii) updates the memory block with the accumulated result.

Table 1 defines a list of acronyms employed throughout this specification as an aid to understanding the described embodiments of the present invention:

TABLE 1

| USB | Universal Serial Bus | FIFO | First-In, First-Out |
|---|---|---|---|
| SATA | Serial Advanced Technology Attachment | I/O | Input/Output |
| SCSI | Small Computer System Interface | DDR | Double Data Rate |
| SAS | Serial Attached SCSI | DRAM | Dynamic Random Access Memory |
| PCI-E | Peripheral Component Interconnect Express | MMB | Memory Manager Block |
| SoC | System-on-Chip | µP | Microprocessor |
| AXI | Advanced eXtensible Interface | PLB | Processor Local Bus |
| AMBA | Advanced Microcontroller Bus Architecture | MPP | Modular Packet Processor |
| PAB | Packet Assembly Block | AAL5 | ATM Adaptation Layer 5 |
| MTM | Modular Traffic Manager | SED | Stream Editor |
| DBC | Data Buffer Controller | TID | Thread Identifier |
| HE | Hash Engine | PQM | Pre-Queue Modifier |
| SENG | State Engine | FBI | Function Bus Interface |
| TID | Task Identifier | CCL | Classification Completion List |
| SCH | Scheduler | SEM | Semaphore Engine |
| SPP | Security Protocol Processor | PCM | Per Context Memory |
| TIL | Task Input Logic | PDU | Protocol Data Unit |
| TCP | Transmission Control Protocol | PIC | Packet Integrity Checker |
| IP | Internet Protocol | CRC | Cyclic Redundancy Check |

Figure 1:
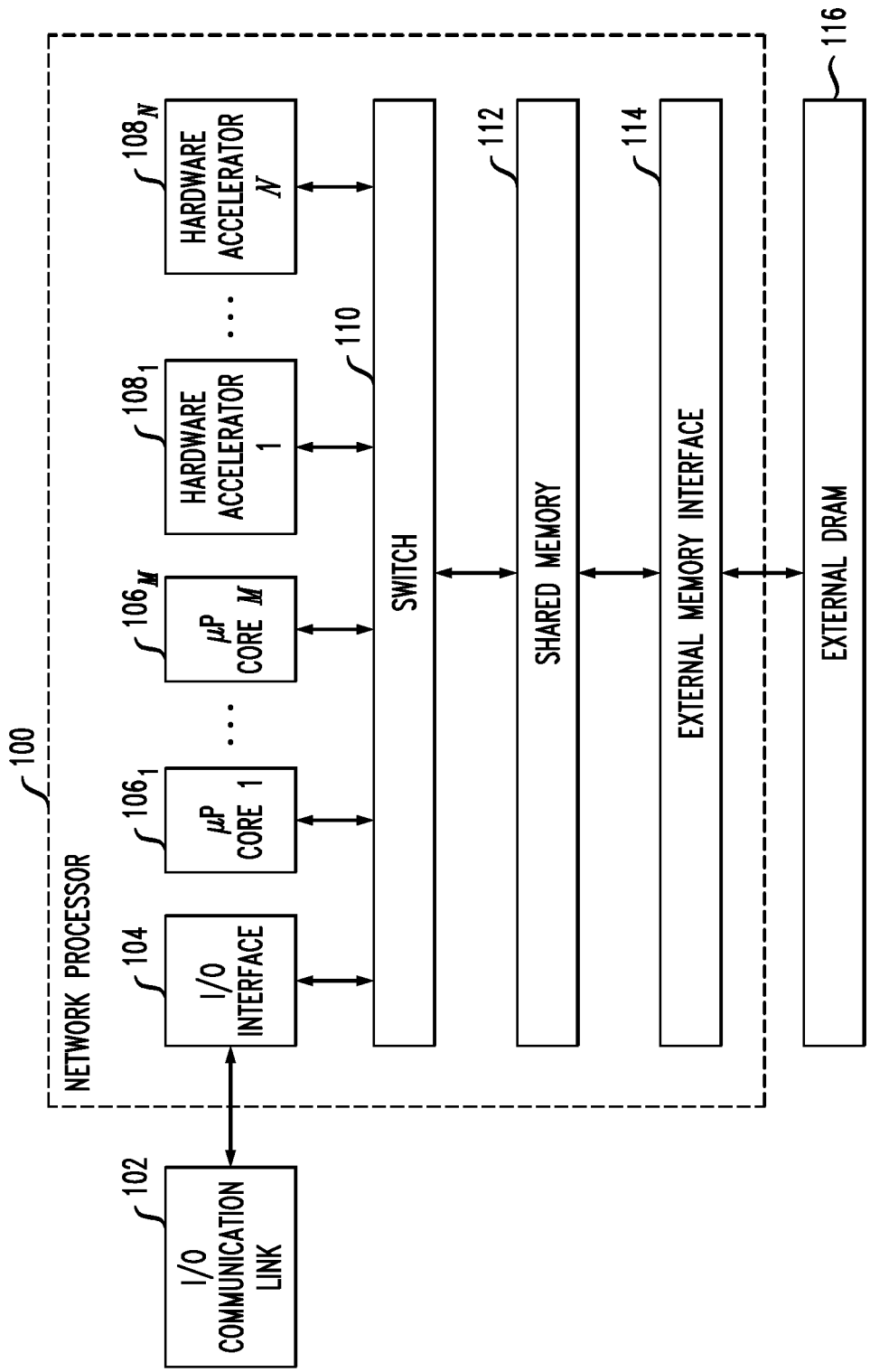
FIG. 1 shows a block diagram of a network processor operating in accordance with exemplary embodiments of the present invention.

FIG. 1 shows a block diagram of an exemplary network processor system (network processor 100) implemented as a system-on-chip (SoC). Network processor 100 might be used for processing data packets, performing protocol conversion, encrypting and decrypting data packets, or the like. As shown in FIG. 1, network processor 100 includes on-chip shared memory 112, one or more input-output (I/O) interfaces collectively shown as I/O interface 104, one or more microprocessor (µP) cores $106_1$-$106_M$, and one or more hardware accelerators $108_1$-$108_N$, where M and N are integers greater than or equal to 1. Network processor 100 also includes external memory interface 114 for communication with external memory 116. External memory 116 might typically be implemented as a dynamic random-access memory (DRAM), such as a double-data-rate three (DDR-3) DRAM, for off-chip storage of data. In some embodiments, such as shown in FIG. 1, each of the one or more I/O interfaces, µP cores and hardware accelerators might be coupled to a switch 110 that is then coupled to shared memory 112. Switch 110 might be implemented as a non-blocking crossbar switch such as described in related U.S. patent application Ser. No. 12/430,438 filed Apr. 27, 2009, Ser. No. 12/729,226 filed Mar. 22, 2010, and Ser. No. 12/729,231 filed Mar. 22, 2010.

I/O interface 104 might typically be implemented as hardware that connects network processor 100 to one or more external devices through I/O communication link 102. I/O communication link 102 might generally be employed for communication with one or more external devices, such as a computer system or a networking device, that interface with network processor 100. I/O communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other interface link. Received packets are preferably placed in a buffer in shared memory 112 by transfer between I/O interface 104 and shared memory 112 through switch 110.

In embodiments of the present invention, shared memory 112 is a conventional memory operating as a cache and might be allocated or subdivided. For example, shared memory 112 might include one or more FIFO queues that might be dynamically allocated to the various µP cores 106 and hardware accelerators 108. External memory interface 114 couples shared memory 112 to external DRAM 116 to provide off-chip storage of data not needed by the various µP cores 106 and hardware accelerators 108 to free space in shared memory 112. The µP cores and hardware accelerators might interact with each other as described in related U.S. patent application Ser. Nos. 12/782,379, 12/782,393, and 12/782,411, all filed May 18, 2010, for example, by one or more communication bus rings that pass "tasks" from a source core to a destination core. As described herein, tasks are instructions to the destination core to perform certain functions, and a task might contain address pointers to data stored in shared memory 112.

As shown in FIG. 1, one or more data packets are transmitted from a transmitting device (not shown) to network processor 100, via I/O communication link 102. Network processor 100 might receive data packets from one or more active data streams concurrently from I/O communication link 102. I/O interface 104 might parse the received data packet and provide the received data packet, via switch 110, to a buffer in shared memory 112. I/O interface 104 provides I/O interfaces and in exemplary embodiments is a command-driven hardware accelerator that connects network processor 100 to external devices. As described herein, network processor 100 might include one or more I/O interfaces. Received packets are preferably placed in shared memory 112 and then one or more corresponding tasks are generated. Transmitted packets are preferably received from a task and transmitted externally. Exemplary I/O interfaces include Ethernet I/O adapters providing integrity checks of incoming data. The I/O adapters might also provide timestamp data for received and transmitted packets that might be used to implement features such as timing over packet (e.g., IEEE 1588). In alternative embodiments, I/O interface 104 might be implemented as input (receive) only or output (transmit) only interfaces.

The various µP cores 106 and hardware accelerators 108 of network processor 100 might include several exemplary types of processors or accelerators. For example, the various µP cores 106 and hardware accelerators 108 might include, for example, a Modular Packet Processor (MPP), a Packet Assembly Block (PAB), a Modular Traffic Manager (MTM), a Memory Management Block (MMB), a Stream Editor (SED), a Security Protocol Processor (SPP), a Regular Expression (RegEx) engine, and other special-purpose modules. In embodiments of the present invention, one or more of the various µP cores 106 and hardware accelerators 108 might be employed as modular packet processor (MPP) in accordance with embodiments of the present invention.

The MPP is a multi-threaded special purpose processor that provides tree based longest prefix and access control list classification. The MPP also has a hardware hash-based classification capability with full hardware management of hash-table additions, deletions, and collisions. Optionally associated with each hash entry is a timer that might be used under software control for tasks such as connection timeout and retransmission timing. The MPP contains a statistics and state management engine, which when combined with the hash table and timer facilities, provides support for state-based protocol processing. The MPP might support millions of flows, limited only by the amount of DRAM capacity assigned to the functions. The MPP architecture might be able to store all per thread state in memory instead of in register files.

The PAB is a command driven hardware accelerator providing a holding buffer with packet assembly, transmit, retransmit, and delete capabilities. An incoming task to the PAB can specify to insert/extra data from anywhere in any assembly buffer. Gaps are supported in any buffer. Locations to insert and extract can be specified to the bit level. Exemplary traditional packet reassembly functions might be supported, such as IP defragmentation. The PAB might also support generalized holding buffer and sliding window protocol transmit/retransmit buffering, providing an offload for features like TCP origination, termination, and normalization.

The MTM is a software-driven accelerator that provides packet scheduling and possibly up to six levels of scheduling hierarchy. The MTM might support millions of queues and schedulers (enabling per flow queuing if desired). The MTM might provide support for shaping and scheduling with smooth deficit weighed round robin (SDWRR) for every queue and scheduler. The MTM might also support multicasting. Each copy of a packet is scheduled independently and can traverse down different virtual pipelines. This enables multicast with independent encapsulations or any other processing. The MTM might also contain a special purpose processor that can be used for fine-grained control of scheduling decisions. This processor can be used to make discard decisions as well as scheduling and shaping decisions.

The SED is a software-driven accelerator that allows for editing of packets. The SED performs packet editing functions that might include adding and modifying packet headers as well as fragmenting or segmenting data (e.g., IP fragmentation). The SED receives packet data as well as parameters from tasks and a task specified per-flow state. The output of the SED becomes the outgoing packet data and can also update task parameters.

The RegEx engine is a packet search engine for state-based cross-packet pattern matching that is multi-threaded accelerator. An exemplary RegEx engine might be implemented such as described in U.S. Pat. No. 7,439,652 or U.S. Patent Application Publication No. 2008/0270342, both of which are incorporated by reference herein in their entireties.

The SPP provides encryption/decryption capabilities and is a command-driven hardware accelerator, preferably having the flexibility to handle protocol variability and changing standards with the ability to add security protocols with firmware upgrades. The ciphers and integrity (hash) functions might be implemented in hardware. The SPP has a multiple ordered task queue mechanism, discussed in more detail below, that is employed for load balancing across the threads.

The MMB allocates and frees memory resources in shared memory 112. Memory is allocated for such applications as task FIFO storage, packet data storage, hash-table collision handling, timer event management, and traffic manager queues. The MMB provides reference counts to each block of memory within shared memory 112. Multiple reference counts allow for more efficient storage of information, such as multicast traffic (data to be sent to multiple destinations) or for retransmission. Multiple reference counts remove the need for replicating the data each time the data is needed. The MMB preferably tracks the memory allocations using a stack-based approach since a memory block recently released is preferably the next block to be allocated for a particular task, reducing cache trashing and cache tracking overhead.

Figure 2:
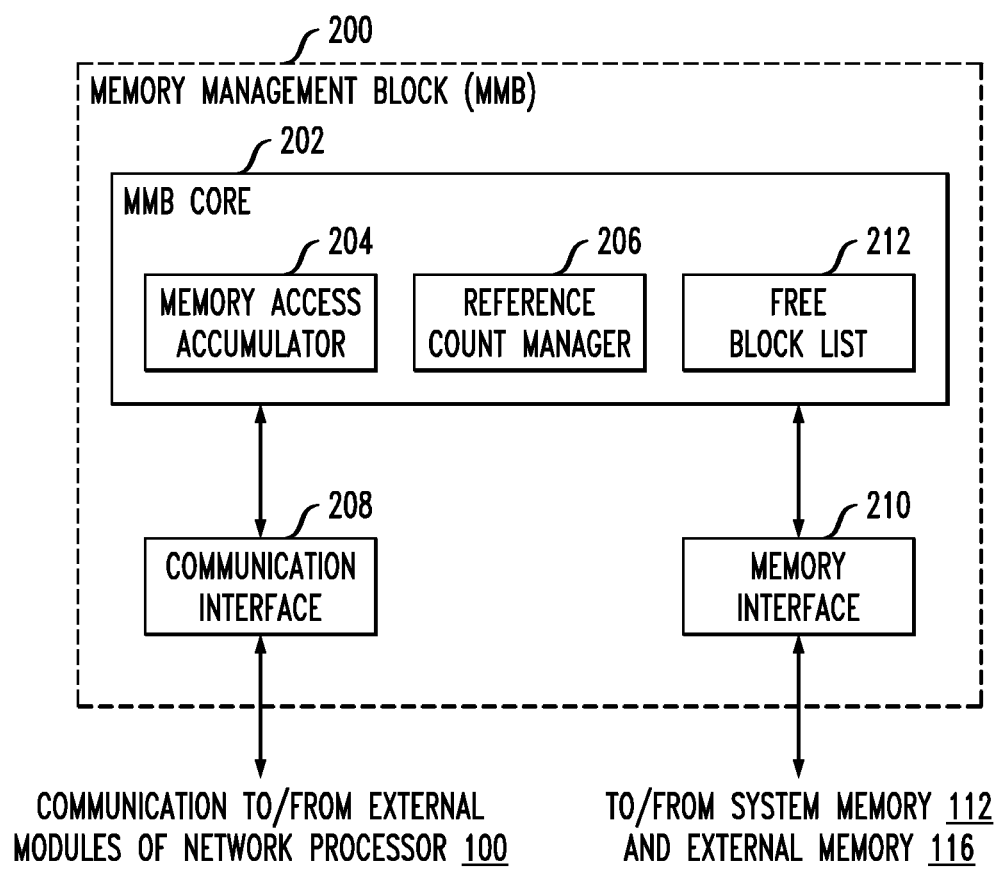
FIG. 2 shows a block diagram of a memory manager submodule of the network processor of FIG. 1.

FIG. 2 shows a block diagram of an exemplary memory management block (MMB) 200, in accordance with embodiments of the present invention. As described, MMB 200 manages memory blocks in system memory 112. System memory 112 might also contain a section of memory in which MMB 200 stores addresses of available or 'free' memory blocks. As shown in FIG. 2, MMB 200 includes memory interface 210 to interface between MMB core 202 and system memory 112 and external memory 116. MMB core 202 might be a processing unit, for example a finite state machine (FSM), for executing memory allocation and deallocation operations, for example, for processing requests for memory blocks and requests to increment or decrement a reference count corresponding to each memory block.

As shown in FIG. 2, MMB 200 includes communication interface 208 that is in communication with one or more modules of network processor 100, for example, the various µP cores 106 and hardware accelerators 108. MMB 200 might typically receive a request to allocate or deallocate a memory block from a requesting module of network processor 100 through a communication ring of network processor 100 coupled to communication interface 208. Requests for memory blocks might be received via a communication ring of network processor 100, such as described in related U.S. patent application Ser. Nos. 12/782,379, 12/782,393, and 12/782,411, all filed May 18, 2010. A memory block request might typically specify the requested memory block size and whether the memory block will be used for a task queue. MMB 200 processes the memory block request and returns an address of a free memory block in system memory 112, if available, to the requestor, via communication interface 208. If no free memory block is available, or a number of available memory blocks reaches a minimum threshold, MMB 200 might deny the request and return an indication that all memory blocks are in use.

MMB 200 might typically return memory block allocation addresses in the order in which the requests are received. MMB core 202 includes memory access accumulator 204 to accumulate one or more memory accesses to a given memory address, as will be described. MMB core 202 also maintains a reference count for each memory block, for example in reference count manager 206. The reference count might allow for a memory block to be used simultaneously by multiple processing modules of network processor 100. The reference count for a given memory block indicates the number of times the memory block is in use by modules of network processor 100. The reference count might typically be undefined when the memory block is initially allocated. The reference count is incremented for each module that needs access to the memory block, and the reference count is decremented as each module completes operation on the memory block. When the reference count for a given memory block is reduced to zero, the memory block is deallocated by MMB core 202. MMB core 202 places the address of the deallocated memory block in free block list 212, allowing the deallocated memory block to be allocated for future memory requests. In some embodiments, the reference count might be stored in a dedicated section of each memory block, for example the first 16 bytes of each block.

Free block list 212 might include one or more lists of memory blocks that are not allocated (i.e., are "free" to be allocated to a requestor). In some embodiments, MMB 200 maintains memory blocks in four sizes, and might also maintain a free block list for each memory block size (e.g., 256 B, 2 kB, 16 kB, and 64 kB). Free block list 212 might also include an associated threshold of minimum free blocks for each block size. When the number of free blocks of a given size falls below the threshold, MMB 200 might deny a request to allocate a new memory block.

Embodiments of the present invention provide protection for data stored in memory by using fixed patterns and without the use of conventional techniques such as ECC or parity.

As described herein, system memory 112 is shared by various modules of network processor 100. Allocation and deallocation of memory blocks within system memory 112 (and/or external memory 116) might typically be managed by MMB 200, and the memory blocks might be available for use by any requesting module of network processor 100. MMB 200 might communicate with system memory 112 (and/or external memory 116) via memory interface 210. As described, MMB 200 might manage four sizes of memory blocks. In general, each memory block might include a segment that is reserved to be written only by the corresponding source requestor module for that memory block. In some embodiments of the present invention, each reserved segment is desirably protected against corruption by, for example, generating and writing protection data to the reserved memory segment of each memory block. This protection data might include i) writing parity data of the block to the reserved memory segment; ii) writing error correction code (ECC) data of the block to the reserved memory segment; and iii) writing a unique identifier of the corresponding source requestor to the reserved memory segment of a block.

In embodiments where the size of the protection data being written to the reserved memory segment is smaller than the total size of the reserved memory segment, unused space in the reserved memory segment might be employed to store ECC or parity data for additional protection of the memory block corresponding to the reserved memory segment. In other embodiments, the protection data might be split into one or more pieces, and the one or more pieces might be stored across the entire reserved memory block with fixed pattern of data written into the unused portions of the reserved memory segment. The unused bits of the reserved memory segment might be filled with non-zero data patterns that are unique to the corresponding source requestor. When the reserved memory segment is read, the non-zero fixed patterns are extracted and verified before the protection data pattern is read. If another requestor modified the memory block, the fixed patterns would be corrupted, as the read fixed pattern would not match the fixed pattern of the corresponding requestor.

Figure 3:
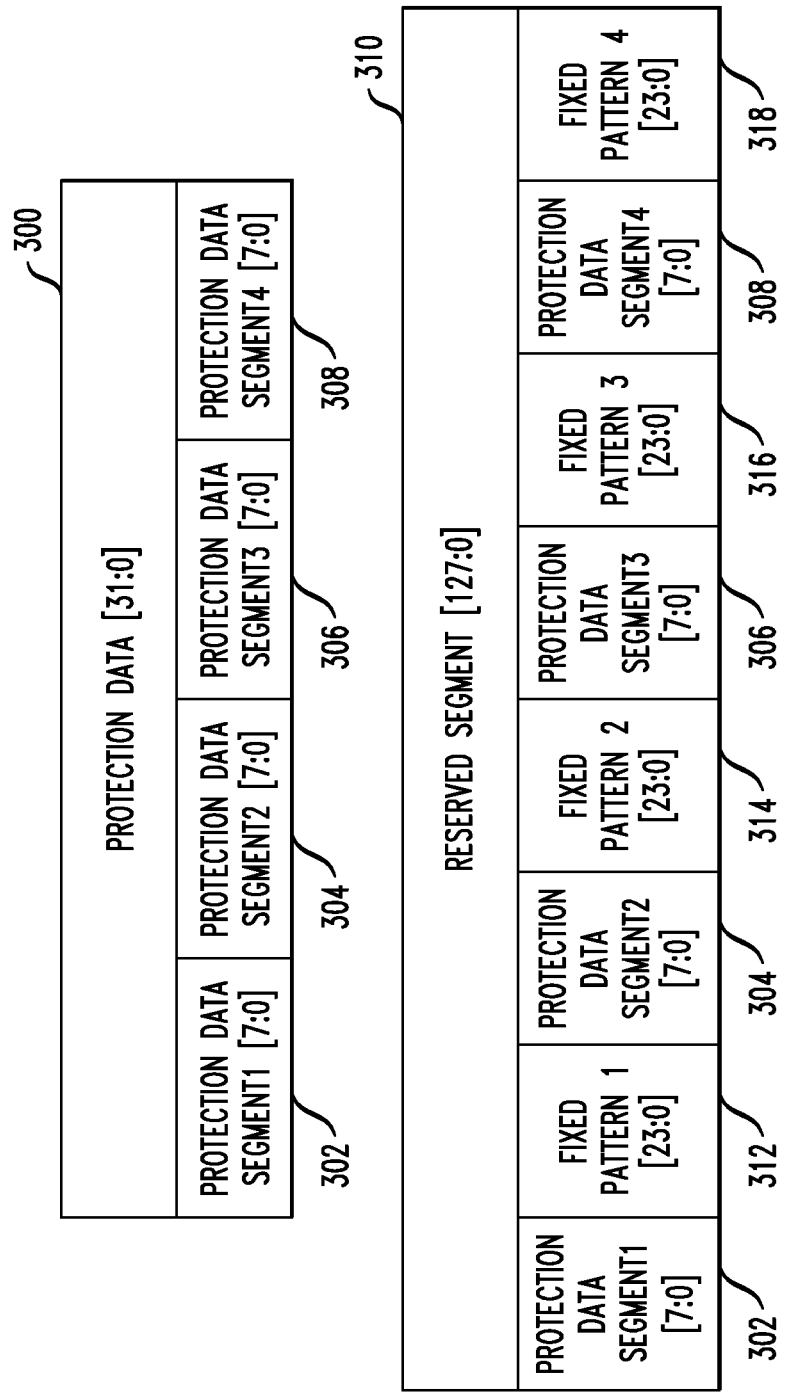
FIG. 3 shows a block diagram of an exemplary memory protection algorithm of the memory manager submodule of FIG. 2.

FIG. 3 shows an exemplary data format where protection data 300 is 32 bits long, and each reserved memory segment, shown as 310, is 128 bits. After MMB 200 writes the 32 bits of protection data 300 to the memory (e.g., system memory 112), reserved memory segment 310 might have 96 bits unused for protection data. As described herein, only one corresponding requestor module might be permitted to write to an allocated one of reserved memory segments 310. Protection data 300 might be split into four 8 bit sections (segment1 302, segment2 304, segment3 306 and segment4 308). Protection data segments 302, 304, 306 and 308 are stored across reserved memory segment 310, with 24 bit fixed patterns (312, 314, 316 and 318) added to pad the protection data to fill reserved memory segment 310.

As shown in FIG. 3, reserved memory segment 310 might be updated on 32 bit boundaries such that a portion of the protection data and a portion of the fixed pattern are stored in each of the four 32 bit portions of the 128 bit reserved memory segment. The data protection segments might be aligned at the top of each 32-bit portion. Thus, embodiments of the present invention protect data stored in a memory block by assigning unique identifiers to each module of network processor 100 that might request allocation of memory blocks from MMB 200. When a memory block is allocated to a memory requestor, the corresponding identifier of the requestor is written to a reserved segment of memory corresponding to the allocated memory block. Each time the memory block is accessed, the requestor identifier is read from the reserved segment, and compared to the identifier of the accessing module. When the identifier of the accessing module matches the identifier read from the reserved segment, the module is allowed access to the memory block. Thus, embodiments of the present invention prevent a memory block from being accessed (and, thus, possibly corrupted) by modules of network processor 100 to which the memory block is not allocated.

Figure 4:
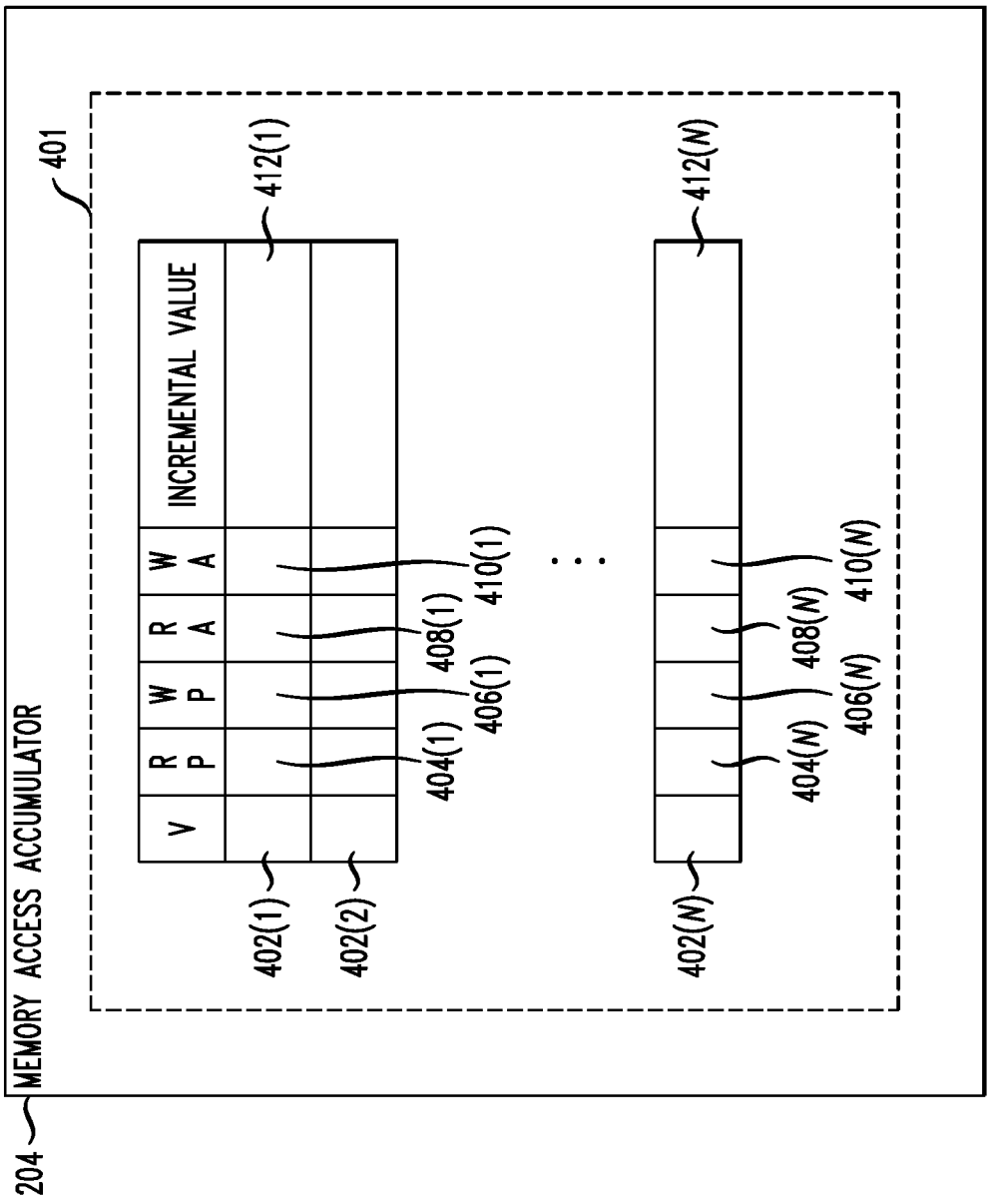
FIG. 4 shows a block diagram of an exemplary memory access accumulator of the memory manager submodule of FIG. 2.

Embodiments of the present invention might replace a data cache with an application-specific circuit to accumulate changes to a memory location, for example the memory access accumulator shown in FIG. 4. While a read or write request to a memory address is being processed, subsequent accesses to the same memory address might be received by MMB 200, but these subsequent requests might not be processed due to the memory address being used for the prior request. Memory access accumulator 204 accumulates the subsequent access requests and update memory (e.g., system memory 112) with the accumulated result rather than performing separate operations for each received access request. The number of memory access operations is reduced, thus reducing memory access latency.

As described herein, network processor 100 might include multiple processors, accelerators or other submodules that might operate in parallel on the same block of data in system memory 112. MMB 200 might track a number of modules accessing each allocated memory block of system memory 112, for example, a reference count for each memory block might be maintained by reference count manager 206. The reference count for a given memory block might be incremented for each module that is accessing that memory block, and decremented when a module relinquishes ownership of the memory block. Reference count manager 206 might not generally enforce ordering of operations to the memory block. Embodiments of the present invention reduce the number of accesses to memory by accumulating memory requests while waiting for memory accesses to be processed.

As shown in FIG. 4, memory access accumulator 204 might contain a storage register 401 to store an incremental value and one or more status indicators to store status data for each allocated memory address of system memory 112. As shown in FIG. 4, storage register 401 of memory access accumulator 204 includes locations for state indicators 402(1)-402(N), 404(1)-404(N), 406(1)-406(N), 408(1)-408(N) and 410(1)-410(N), and incremental value storage register 412(1)-422(N) for each of up to N memory addresses, where N is a positive integer. As shown in FIG. 4, for the ith entry, corresponding state indicator 402(1) might indicate whether an entry is valid, state indicator 404(1) might indicate that a read operation is pending for the corresponding memory address, state indicator 406(1) might indicate that a write operation is pending for the corresponding memory address, state indicator 408(1) might indicate that a read operation is active for the corresponding memory address, and state indicator 410(1) might indicate that a write operation is active for the corresponding memory address.

Storage register 412(1) stores the accumulated incremental value of one or more memory access requests (e.g., reference count requests) for a corresponding memory address. The accumulated incremental value will be written to the corresponding memory address once the memory address becomes available. Thus, each of the state indicators 402, 404, 406, 408 and 410 identify what operations have been processed for each corresponding memory address. Memory access accumulator 204 supports memory access requests such as incrementing a value in memory, decrementing a value in memory, forcing a value in memory, or any other arithmetic or storage function.

In general, memory access accumulator might process a received memory access request by 1) allocating a tracking entry for the requested memory address; 2) accumulating the incremental value of the requested memory address; 3) fetching the data stored at the requested memory address; 4) applying the value in the corresponding incremental storage register to the value fetched from the memory address; 5) writing the updated value to the memory address; 6) waiting for the write acknowledge from memory; and 7) invalidating the tracking entry.

Figure 5:
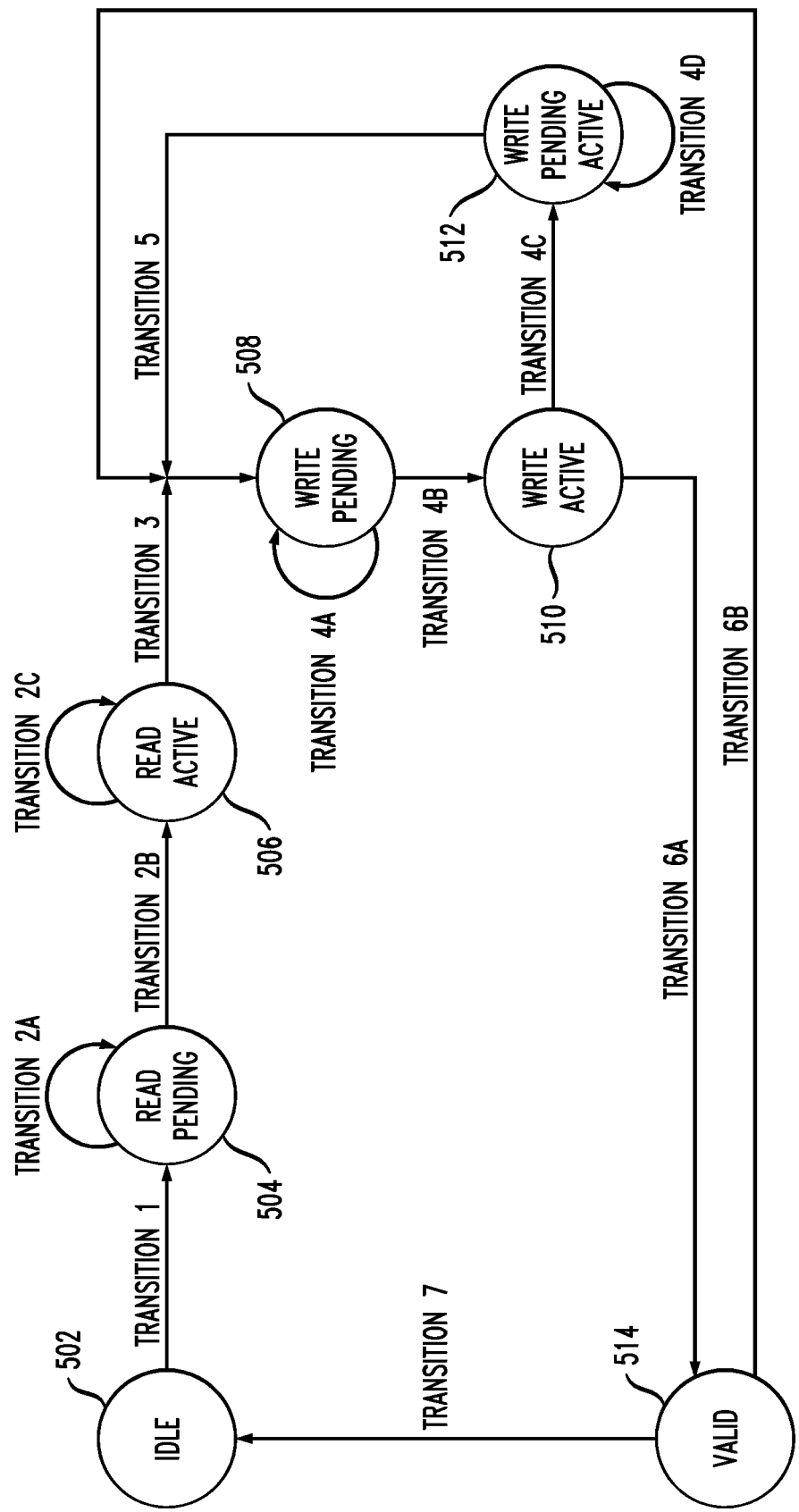
FIG. 5 shows a state diagram of an exemplary state machine of the memory manager submodule of FIG. 2.

FIG. 5 shows an exemplary state diagram of finite state machine (FSM) 500 operating on memory access accumulator 204 of FIG. 2, and with the exemplary structure of FIG. 4. As shown in FIG. 5, at state 502 memory access accumulator 204 is in an idle state until MMB 200 receives a memory access request for a given memory address from a requestor module of network processor 100. As indicated by transition 1, upon receiving a memory access request, FSM 500 moves to state 504. At state 504, memory access accumulator 204 allocates an entry in state indicators 402, 404, 406, 408 and 410, and incremental value storage register 412 corresponding to the requested memory address and the incremental value is stored into incremental value storage register 412. At state 504, valid indicator 402 and read pending indicator 404 are set for the corresponding entry. Reference count manager 206 increments the reference count corresponding to the requested address.

As indicated by transition 2A, if a new request for the same memory address is received by MMB 200 before the memory address is read, the incremental value is the corresponding one of register 412 that is updated to reflect the new memory access request. Reference count manager 206 updates the reference count corresponding to the requested address. Once the read operation is issued to system memory 112, FSM 500 proceeds to state 506, as indicated by transition 2B. At state 506, the read operation is active, that is, MMB 200 is reading the value stored in the requested memory address. Read pending indicator 404 is cleared and read active indicator 406 is set. As indicated by transition 2C, if a new request for the same memory address is received by MMB 200 before the read operation is complete, the incremental value is the corresponding one of register 412 is updated to reflect the new memory access request. Reference count manager 206 updates the reference count corresponding to the requested address.

As indicated by transition 3, when the read request is processed and the data from the requested address is returned, FSM 500 proceeds to write pending state 508. At state 508 the read data is merged with the incremental value and stored to register 412. Read active indicator 406 is cleared and write pending indicator 408 is set. The value stored in register 412 is the value to be written back to the memory address, and includes all incremental updates. As indicated by transition 4A, if a new request for the same memory address is received by MMB 200 before the write operation is complete, the incremental value is the corresponding one of register 412 is updated to reflect the new memory access request. Reference count manager 206 updates the reference count corresponding to the requested address.

As indicated by transition 4B, memory access accumulator sends the write request to the memory to update the corresponding memory address, and FSM 500 proceeds to write active state 510. Write pending indicator 408 is cleared, and write active indicator 410 is set. As indicated by transition 4C, if a new request for the same memory address is received by MMB 200 before the write acknowledge is received (i.e., before the write operation is complete), FSM 500 transitions to write pending active state 512. At state 512, the value of register 412 is updated and write pending indicator 408 is set for the memory address to be written again. Reference count manager 206 updates the reference count corresponding to the requested address because, in general, MMB 200 might not permit two concurrent active write operations to the same memory address. The write operation is acknowledged by the memory when the incremental value is written to the memory address, so the write operation is considered an atomic access.

As indicated by transition 4D, if a new request for the same memory address is received by MMB 200 before the write acknowledge is received (i.e., before the write operation is complete), FSM 500 remains in write pending active state 512. Reference count manager 206 updates the reference count corresponding to the requested address. At state 512, the value in register 412 is updated and write pending indicator 408 is set for the memory address to be written again. As indicated by transition 5, FSM 500 could loop between write pending state 508, write active state 510, and write pending active state 512 if access requests for the same memory address are received while waiting for the write acknowledge.

As indicated by transition 6A, once the write acknowledge is received (i.e., the write operation is complete), FSM 500 proceeds to valid state 514. At state 514, write active indicator 410 is cleared. FSM 500 remains in valid state 514 until another memory access request is received. If the received memory access request is for the same memory address, reference count manager 206 updates the reference count corresponding to the requested address and FSM 500 returns to write pending state 508 as indicated by transition 6B. If the corresponding state indicators 402, 404, 406, 408 and 410, and incremental value storage register 412 are needed for a different memory address, the valid bit for the entry might be cleared, and FSM 500 might return to idle state 502, as indicated by transition 7.

Thus, embodiments of the present invention provide support for a subsequent operation request to the same memory location at any state of FSM 500. If the subsequent memory access request occurs in a state of FSM 500 where the corresponding memory address has already been read, then the memory access request is processed by updating the incremental value in the corresponding one of register 412. As described above, if a new memory access request occurs in any state, the incremental value in register 412 is updated. If a new request occurs after a write to memory is issued and before the write acknowledge is received, the incremental value in register 412 is updated and a second write to the memory address occurs. This incremental updating saves read requests of the memory, thus reducing a potential bottleneck for access to memory 112.

Thus, as described herein, embodiments of the present invention provide a memory manager for a network processor having a plurality of processing modules and a shared memory. The memory manager allocates blocks of the shared memory to requesting ones of the plurality of processing modules. A free block list tracks availability of memory blocks of the shared memory. A reference counter maintains, for each allocated memory block, a reference count indicating a number of access requests to the memory block by ones of the plurality of processing modules. The reference count is located with data at the allocated memory block. For subsequent access requests to a given memory block concurrent with processing of a prior access request to the memory block, a memory access accumulator (i) accumulates an incremental value corresponding to the subsequent access requests, (ii) updates the reference count associated with the memory block, and (iii) updates the memory block with the accumulated result.

While the exemplary embodiments of the present invention have been described with respect to processing blocks in a software program, including possible implementation as a digital signal processor, micro-controller, or general purpose computer, the present invention is not so limited. As would be apparent to one skilled in the art, various functions of software might also be implemented as processes of circuits. Such circuits might be employed in, for example, a single integrated circuit, a multi-chip module, a single card, or a multi-card circuit pack.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention.

The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

It will be further understood that various changes in the details, materials, and arrangements of the parts which have been described and illustrated in order to explain the nature of this invention might be made by those skilled in the art without departing from the scope of the invention as expressed in the following claims.

We claim:

1. A memory manager for a network processor having a plurality of processing modules, the memory manager coupled to at least one shared memory, the memory manager comprising:
   a memory manager core configured to allocate one or more blocks of the at least one shared memory to a requesting one of the plurality of processing modules;
   a free block list configured to track availability of one or more memory blocks of the shared memory;
   a reference counter configured to maintain, for each allocated memory block, a reference count value indicating a number of access requests of corresponding ones of the plurality of processing modules accessing the memory block, the reference count value located with data at the allocated memory block;
   a memory access accumulator configured to, for one or more subsequent access requests to a given memory address corresponding to an allocated memory block concurrent with processing of at least one prior access request to the given memory address: (i) accumulate an incremental value corresponding to the one or more subsequent access requests, (ii) update the reference count value associated with the given memory address, and (iii) update a value stored at the given memory address with the accumulated incremental value during a data operation corresponding to a most recent of the one or more subsequent access requests.

2. The memory manager of claim 1, wherein the reference counter maintains the reference count value of a given allocated memory block by incrementing the reference count value for each corresponding processing module accessing the given allocated memory block, and decrementing the reference count value when a corresponding processing module ends accessing the memory block.

3. The memory manager of claim 2, wherein, when a number of free memory blocks in the free block list reaches a minimum threshold, the memory manager core is further configured to deny a memory allocation request of the requesting one of the plurality of processing modules.

4. The memory manager of claim 1, wherein a size for each memory block is selected as one of: 256 B, 2 kB, 16 kB, and 64 kB.

5. The memory manager of claim 1, wherein each memory block includes a corresponding reserved area for protection data.

6. The memory manager of claim 5, wherein the protection data includes at least one of: (i) parity data of the data stored in the corresponding memory block; (ii) error correction code (ECC) data of the data stored in the corresponding memory block; and (iii) a unique identifier of a corresponding processing module of the network processor associated with the corresponding allocated memory block.

7. The memory manager of claim 6, wherein:
the protection data is 32 bits long and is split into four 8 bit sections;
the corresponding reserved area is 128 bits long; and
the four 8 bit sections of the protection data are padded with a fixed pattern of data corresponding to the processing module of the network processor to which the corresponding memory block is allocated, wherein the fixed pattern of data is 96 bits long and is split into four 24 bit sections.

8. The memory manager of claim 1, wherein the network processor is implemented in an integrated circuit.

9. A method of managing a shared memory of a network processor having a plurality of processing modules and at least one shared memory, the method comprising:
allocating, by a memory manager core, one or more blocks of the at least one shared memory to a requesting one of the plurality of processing modules;
tracking, by a free block list, availability of one or more memory blocks of the shared memory;
maintaining, by a reference counter, for each allocated memory block, a reference count value indicating a number of access requests of corresponding ones of the plurality of processing modules accessing the memory block, the reference count value located with data at the allocated memory block;
for one or more subsequent access requests to a given memory address corresponding to an allocated memory block concurrent with processing of at least one prior access request to the given memory address:
accumulating, by a memory access accumulator, an incremental value corresponding to the one or more subsequent access requests;
updating the reference count value associated with the given memory address; and
updating a value stored at the given memory address with the accumulated incremental value during a data operation corresponding to a most recent of the one or more subsequent access requests.

10. The method of claim 9, further comprising:
incrementing, by the reference counter, the reference count value of a given allocated memory block for each corresponding processing module accessing the given allocated memory block; and
decrementing, by the reference counter, the reference count value when a corresponding processing module ends accessing the memory block.

11. The method of claim 10, further comprising:
denying, by the memory manager core, when a number of free memory blocks in the free block list reaches a minimum threshold, a memory allocation request of the requesting one of the plurality of processing modules.

12. The method of claim 9, wherein a size for each memory block is selected as one of: 256 B, 2 kB, 16 kB, and 64 kB.

13. The method of claim 9, further comprising:
generating, by the memory manager core, for each of the plurality of processing modules of the network processor, a unique identifier corresponding to each processing module;
writing protection data to a corresponding reserved area of an allocated memory block, wherein the protection data includes the unique identifier of a corresponding one of the processing modules to which the corresponding memory block is allocated.

14. The method of claim 13, wherein the protection data includes at least one of: (i) parity data of the data stored in the corresponding memory block; (ii) error correction code (ECC) data of the data stored in the corresponding memory block; and (iii) a unique identifier of a corresponding processing module of the network processor associated with the corresponding allocated memory block.

15. The method of claim 14, wherein the protection data is 32 bits long and is split into four 8 bit sections and the corresponding reserved area is 128 bits long, and wherein the method further comprises:
padding, by the memory manager core, the four 8 bit sections of the protection data with the unique identifier corresponding to the processing module to which the corresponding memory block is allocated, wherein the unique identifier is 96 bits long and is split into four 24 bit sections.

16. A non-transitory machine-readable storage medium, having encoded thereon program code, wherein, when the program code is executed by a machine, the machine implements a method of managing a shared memory of a network processor having a plurality of processing modules and at least one shared memory, the method comprising:
allocating, by a memory manager core, one or more blocks of the at least one shared memory to a requesting one of the plurality of processing modules;
tracking, by a free block list, availability of one or more memory blocks of the shared memory;
maintaining, by a reference counter, for each allocated memory block, a reference count value indicating a number of access requests of corresponding ones of the plurality of processing modules accessing the memory block, the reference count value located with data at the allocated memory block;
for one or more subsequent access requests to a given memory address corresponding to an allocated memory block concurrent with processing of at least one prior access request to the given memory address:
accumulating, by a memory access accumulator, an incremental value corresponding to the one or more subsequent access requests;
updating the reference count value associated with the given memory address; and
updating a value stored at the given memory address with the accumulated incremental value during a data operation corresponding to a most recent of the one or more subsequent access requests.

17. The non-transitory machine-readable storage medium of claim 16, further comprising:
incrementing, by the reference counter, the reference count value of a given allocated memory block for each corresponding processing module accessing the given allocated memory block; and
decrementing, by the reference counter, the reference count value when a corresponding processing module ends accessing the memory block.

18. The non-transitory machine-readable storage medium of claim 17, further comprising:
denying, by the memory manager core, when a number of free memory blocks in the free block list reaches a minimum threshold, a memory allocation request of the requesting one of the plurality of processing modules.

19. The non-transitory machine-readable storage medium of claim 16, wherein a size for each memory block is selected as one of: 256 B, 2 kB, 16 kB, and 64 kB.

20. The non-transitory machine-readable storage medium of claim 16, further comprising:
- generating, by the memory manager core, for each of the plurality of processing modules of the network processor, a unique identifier corresponding to each processing module;
- writing protection data to a corresponding reserved area of an allocated memory block, wherein the protection data includes the unique identifier of a corresponding one of the processing modules to which the corresponding memory block is allocated.

* * * * *